(12) United States Patent
Kodama

(10) Patent No.: US 8,307,125 B2
(45) Date of Patent: Nov. 6, 2012

(54) FIELD INSTRUMENT MANAGEMENT APPARATUS

(75) Inventor: Kazutoshi Kodama, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 813 days.

(21) Appl. No.: 12/395,003

(22) Filed: Feb. 27, 2009

(65) Prior Publication Data

US 2009/0222242 A1 Sep. 3, 2009

(30) Foreign Application Priority Data

Mar. 3, 2008 (JP) ................................ 2008-052434

(51) Int. Cl.
*G06F 15/177* (2006.01)
*G06F 15/16* (2006.01)

(52) U.S. Cl. ....................................... 709/253; 709/220

(58) Field of Classification Search ................... 709/223, 709/253, 220
See application file for complete search history.

(56) References Cited

U.S. PATENT DOCUMENTS

| | | | |
|---|---|---|---|
| 5,980,078 A * | 11/1999 | Krivoshein et al. ............... 700/1 |
| 6,618,630 B1 * | 9/2003 | Jundt et al. ....................... 700/17 |
| 6,947,389 B1 * | 9/2005 | Chen et al. ..................... 370/252 |
| 7,082,340 B2 * | 7/2006 | Fehrer et al. ..................... 700/83 |
| 7,675,932 B2 * | 3/2010 | Schumacher ................. 370/463 |
| 2003/0014536 A1 | 1/2003 | Christensen et al. |
| 2007/0078980 A1 | 4/2007 | Tomita et al. |
| 2007/0079250 A1 * | 4/2007 | Bump et al. .................. 715/762 |
| 2007/0129820 A1 * | 6/2007 | Glanzer et al. .................. 700/20 |
| 2008/0112388 A1 * | 5/2008 | Garrett et al. ................. 370/351 |
| 2008/0320402 A1 * | 12/2008 | Isenmann et al. ............. 715/762 |

FOREIGN PATENT DOCUMENTS

JP 2005-109745 A 4/2005

OTHER PUBLICATIONS

European Search Report corresponding to European Patent Application No. 09002869.7, dated Apr. 13, 2010.
Isao Hirooka, et al. "FieldMate Field Device Management Tool for the New Era", Yokogawa Technical Report English Edition, 2007, pp. 9-12, No. 44.
Japanese Office Action corresponding to Japanese Patent Application No. 2008-052434, dated Jan. 31, 2012.

* cited by examiner

*Primary Examiner* — Larry Donaghue
(74) *Attorney, Agent, or Firm* — Sughrue Mion, PLLC

(57) ABSTRACT

A field instrument management apparatus, which manages a field instrument by communicating with the field instrument via a field bus, transfers a request for an instrument address to the field instrument, and provides the instrument address to an outside when the instrument address is acquired from the field instrument.

5 Claims, 3 Drawing Sheets

FIELD INSTRUMENT MANAGEMENT APPARATUS

BACKGROUND OF THE INVENTION

1. Field of the Invention

The present invention relates to a field instrument management apparatus.

Priority is claimed on Japanese Patent Application No. 2008-52434, filed Mar. 3, 2008, the content of which is incorporated herein by reference.

2. Description of Related Art

As is well-known, various measurement instruments, which are called field instruments on the whole, measure various process values in a plant, and a control apparatus controls all kinds of measurement instruments included in the plant, based on measurement results made by the field instrument. The control apparatus and various measurement instruments are connected by a field bus such as Foundation Fieldbus, Highway Address Remote Transducer (HART: registered trademark), and the like. The control apparatus communicates with the various measurement instruments through the field bus, so as to achieve control of various process instruments.

Maintenance of the field instruments is performed regularly based on the maintenance plan of the plant, or when trouble in a system irregularly occurs or field instruments are added and set. There is a management tool, which is used for maintenance and the like of the field instruments, FieldMate (registered trademark) disclosed in a Non-Patent document, (refer to "FieldMate FIELD DEVICE MANAGEMENT TOOL FOR THE NEW ERA", Isao Hirooka, Youji Saitou, Mizuo Kawahara, and Hironori Murata, Yokogawa Technical Report English Edition, No. 44, pp. 9-12, 2007). This management tool is installed in a notebook type personal computer (PC), which is connected with the field bus, and the like. The management tool is an application program that enables us to manage settings, adjust various parameters of the field instruments, and perform maintenance of the field instruments.

The conventional management tool described above acquires all instrument information including an instrument address from the all field instruments primarily, and then, operates management processes of each field instrument, when management of the field instruments is performed. Therefore, when the number of the field instruments is large, it takes a long time to acquire the all instrument information, since a communication speed (transmission speed) of the field bus is relatively slow. For this reason, there is a problem in that the management processes can not be promptly performed. For example, when the six field instruments are connected through the Foundation Fieldbus, it takes about 4 minutes to acquire all of the instrument information from all of the field instruments.

SUMMARY OF THE INVENTION

The present invention was achieved in view of the above circumstances, and has as its object to provide a field instrument management apparatus that can perform the management processes of a filed instrument faster than the conventional case.

For a first aspect, a field instrument management apparatus for managing a field instrument by communicating therewith includes a management unit that transfers a first request, which requests to provide an instrument address, to the field instrument, and provides the instrument address to the outside at a first time at which the instrument address is acquired from the field instrument.

The field instrument management apparatus of the first aspect, wherein the management unit may transfer a second request, which requests to provide an instrument tag name and an instrument identification (ID), to the field instrument at the first time at which the instrument address is acquired from the field instrument, and may provide the instrument tag name and the instrument ID to the outside at a second time at which the instrument tag name and the instrument ID are acquired from the field instrument.

The field instrument management apparatus of the first aspect may further include an individual management tool that manages the field instrument, wherein, at the second time at which the instrument tag name and the instrument ID are acquired from the field instrument, the individual management tool corresponding to the instrument tag name and the instrument ID is set in a state capable of starting up, and the management unit provides the state to the outside.

The field instrument management apparatus of the first aspect, wherein the individual management tool may transfer a third request, which requests to change a setting of the field instrument, to the field instrument, based on an instruction from the outside, after the second time.

The field instrument management apparatus of the first aspect may further include a communication portion that includes a local area network (LAN) communication portion, a communication server, and a LAN cable.

The field instrument management apparatus of the first aspect may further include a field bus communication portion that directly communicates with the field instrument.

The field instrument management apparatus of the first aspect, wherein the management unit may manage a plurality of the field instruments.

The field instrument management apparatus of the first aspect may further include a storage portion that stores each of the acquired instrument address, the acquired instrument tag name, the acquired instrument ID, the management unit, and the individual management tool.

The field instrument management apparatus of the first aspect, wherein each of the acquired instrument address, the acquired instrument tag name, and the acquired instrument ID may be provided visually.

The field instrument management apparatus of the first aspect, wherein each of the acquired instrument address, the acquired instrument tag name, and the acquired instrument ID may be provided auditorialy.

The field instrument management apparatus of the first aspect may further include an operation portion.

The field instrument management apparatus of the first aspect may further include a control and computing portion.

For a second aspect, a control method, in which a field instrument management apparatus manages a field instrument by communicating therewith, the control method includes transferring a first request for an instrument address to the field instrument, and providing the instrument address to the outside at a first time at which the instrument address is acquired from the field instrument.

The control method of the second aspect may further include transferring a second request for an instrument tag name and an instrument identification (ID) to the field instrument at the first time at which the instrument address is acquired from the field instrument, and providing the instrument tag name and the instrument ID to the outside at a second time at which the instrument tag name and the instrument ID are acquired from the field instrument.

The control method of the second aspect may further include setting an individual management tool corresponding to the instrument tag name and the instrument ID to be in a state capable of starting up, and providing the state to the outside, at the second time at which the instrument tag name and the instrument ID are acquired from the field instrument.

DETAILED DESCRIPTION OF THE INVENTION

An embodiment of the present invention will be described hereinbelow with reference to the drawings.

Figure 1:
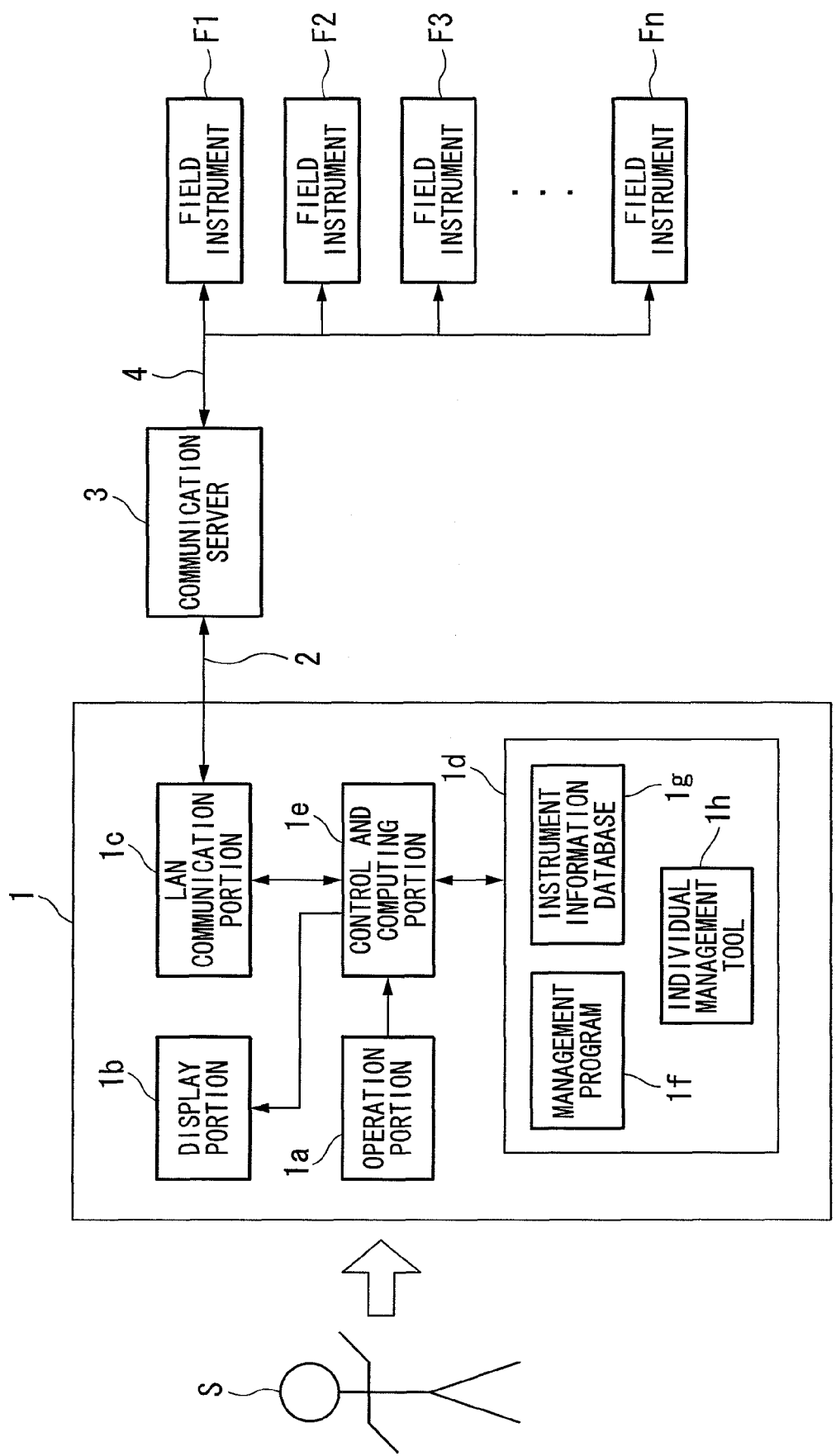
FIG. 1 is a block diagram that shows a system configuration of a field instrument management system including a client computer (field instrument management apparatus) according to an embodiment of the present invention.

FIG. 1 is a block diagram that shows a system configuration of a field instrument management system including a client computer (field instrument management apparatus) 1 according to a present embodiment of the present invention. This field instrument management system manages a plurality (n-set) of field instruments F1 to Fn, and includes the client computer 1, a local area network (LAN) cable, a communication server 3, and a filed bus 4.

The client computer 1 is a general purpose computer such as a personal computer or the like, and is operated by an operator S (including a user) who engages in monitoring a plant or maintenance of the plant. The client computer includes an operation portion 1a such as a keyboard, a mouse and the like, a display portion 1b such as a liquid crystal display and the like, a LAN communication portion 1c that communicates with an outside in accordance with a communication standard of LAN, a storage portion 1d that stores various application programs, an operating system (OS) or the like, the various application programs described above, the operating system, and control and computing portion 1e that controls each of the above-mentioned portions based on the operation information input from the operation portion 1a, received information received by the LAN communication portion 1c, or the like.

The storage portion 1d stores a management program 1f, an instrument information database 1g, and an individual management tool 1h, in addition to the operating system (unillustrated). The management program 1f is an application program that manages each of the field instruments F1 to Fn. The instrument information database 1g contains various attribute information that relates to each of the field instruments F1 to Fn, and is registered in each of the field instruments F1 to Fn as instrument information. The instrument information database 1g is assembled by acquiring the instrument information from each of the field instruments F1 to Fn via the LAN cable 2, the communication server 3, and the field bus 4. The individual management tool 1h is a management program (application program) which is specialized in each of the field instruments F1 to Fn such as a flow meter, a pressure gage, a thermometer and the like. The individual management tool 1h exclusively manages the corresponding field instruments F1 to Fn.

The LAN cable 2 is a signal cable that includes mechanical and electrical properties in accordance with the communication standard of LAN. The LAN cable 2 connects the client computer 1 and the communication server 3 so as to be able to communicate with each other. The communication server 3 intermediates a communication between the client computer 1 and each of the field instruments F1 to Fn. The communication server 3 acquires the instrument information from each of the field instruments F1 to Fn so as to provide the acquired instrument information to the client computer 1, in response to a request from the client computer 1. The field bus 4 is a communication bus which is standardized for communication in the plant, such as Foundation Fieldbus, HART (registered trademark) and the like. The field bus 4 connects the communication server 3 and each of the field instruments F1 to Fn so as to be able to communicate with each other.

Subsequently, a management operation of the client computer (field instrument management apparatus) 1 will be described in detail hereinbelow with reference to FIG. 2 and FIG. 3.

Figure 2:
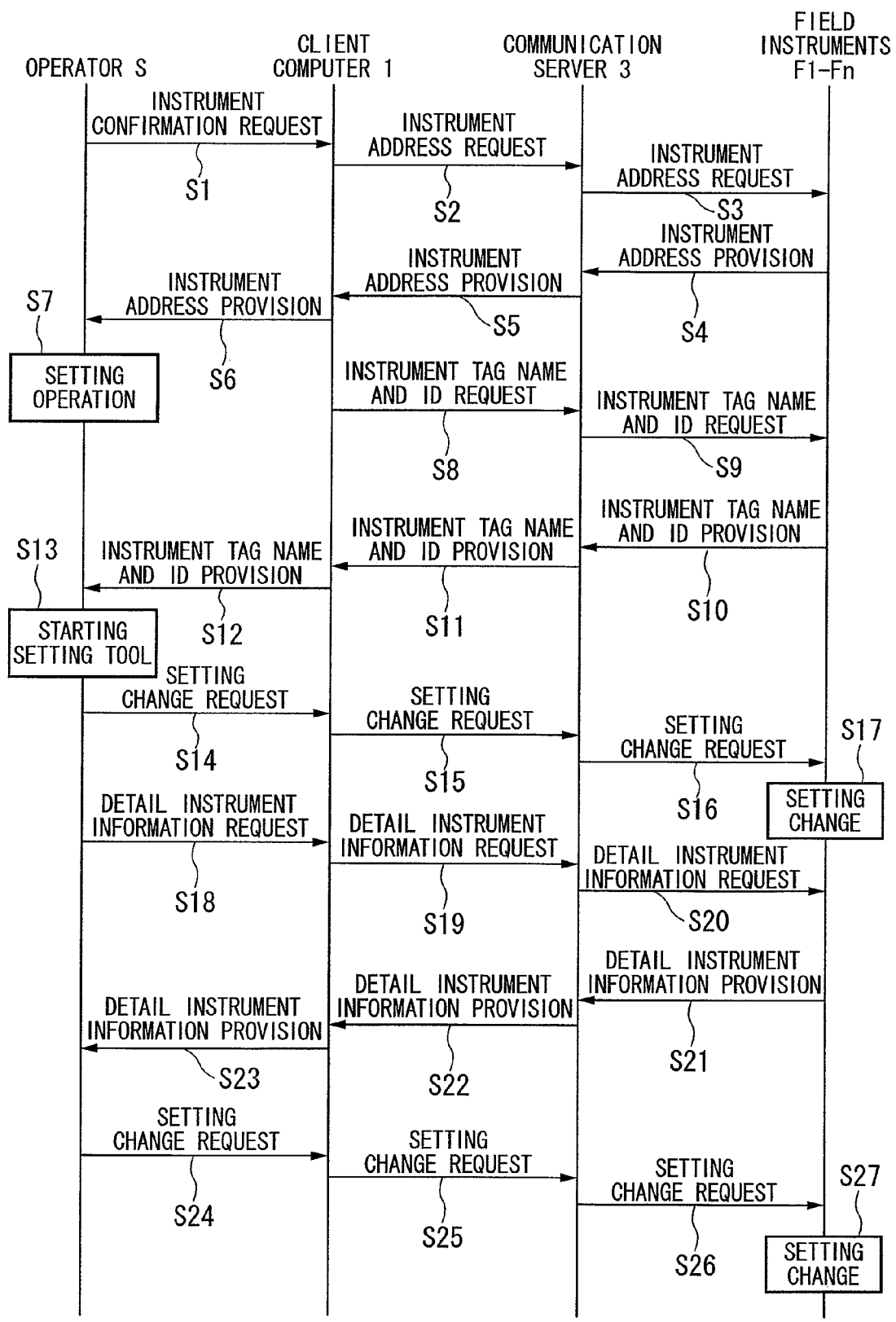
FIG. 2 is a sequence diagram that shows an operation of the field instrument management system according to the embodiment of the present invention.

FIG. 2 is a sequence diagram that shows an operation of the field instrument management system of the present invention.

When a confirmation request (instrument confirmation request) related to each of the field instruments F1 to Fn is input to the client computer 1 by the operator S operating the operation portion 1a (step S1), the client computer 1 transfers an instrument address request to the communication server 3 (step S2). That is, the operation portion 1a of the client computer 1 outputs the instrument confirmation request to the control and computing portion 1e when the client computer 1 receives the instrument confirmation request from the operator S. As a result, the control and computing portion 1e outputs the instrument address request to the LAN communication portion 1c, and allows the LAN communication portion 1c to transfer the instrument address request to the communication server 3.

The instrument address request described above requests that all of the field instruments F1 to Fn provide the instrument address assigned individually to each of the field instruments F1 to Fn, based on the specification of the field bus 4. When the communication server 3 receives such an instrument address request, the communication server 3 transfers a similar instrument address request to all of the field instruments F1 to Fn (step S3).

When each of the field instruments F1 to Fn receives the instrument address request from the communication server 3, each of the field instruments F1 to Fn transfers (provides) the instrument address stored therein to the communication server 3 (step S4). Then, the communication server 3 transfers the instrument address acquired from each of the field instruments F1 to Fn to the client computer 1 (step S5). The client computer 1 provides the acquired instrument addresses of all of the field instruments F1 to Fn as described above to the operator S through the display portion 1b (step S6). That is, the control and computing portion 1e of the client computer 1 outputs the instrument address to the display portion 1b so as to display when the instrument address is input from the LAN communication portion 1c.

Since the field instrument under suspension (suspended instrument) does not communicate via the communication server 3 and the field bus 4, the suspended instrument does not receive the instrument address request from the communication server 3. Therefore, the suspended instrument does not transfer the instrument address to the communication server 3. The communication server 3 transfers an instrument address, which is received only within a predetermined period from sending the instrument address request to each of the field instruments F1 to Fn, to the client computer 1. Hereinafter, all of the field instruments F1 to Fn are assumed to be in an operation state, and assumed to send the instrument address to the communication server 3.

Figure 3:
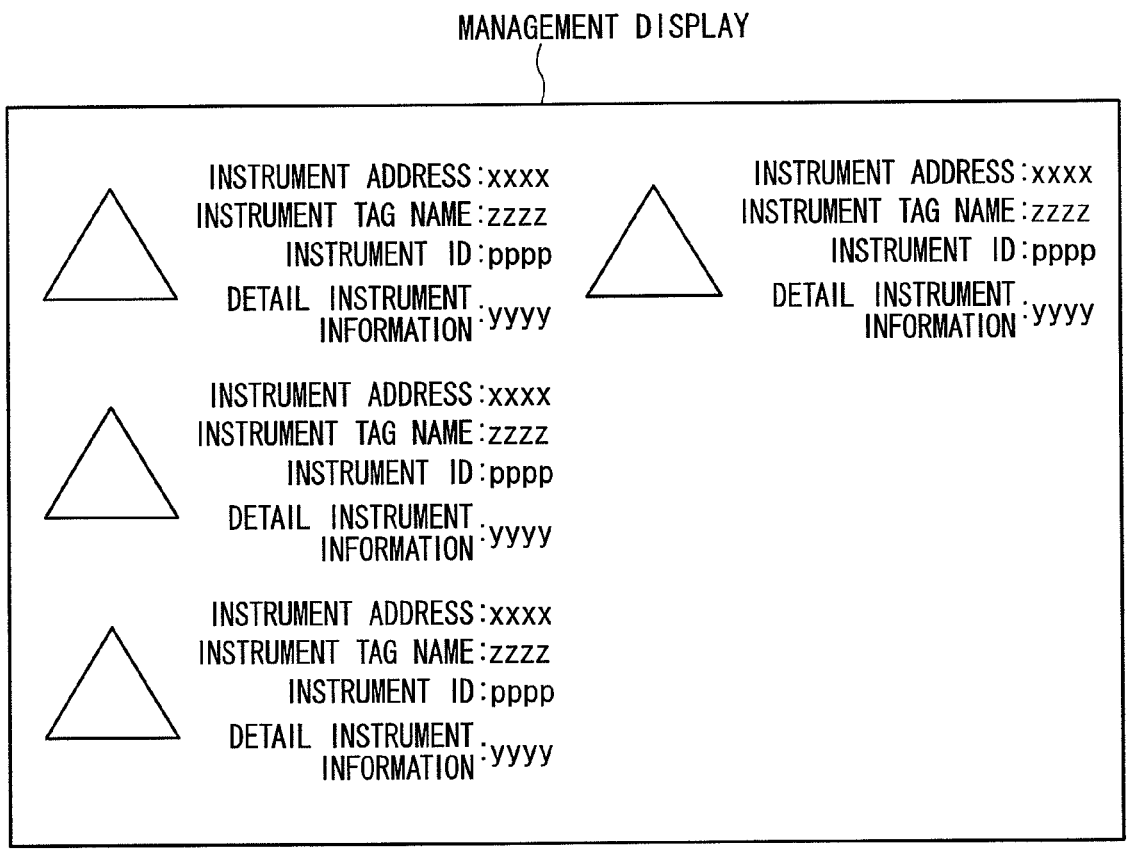
FIG. 3 is a schematic diagram that shows a management screen displayed on a display portion shown in FIG. 1, according to the embodiment of the present invention.

FIG. 3 shows a schematic diagram of a management screen that shows the instrument information of the each of the field instruments F1 to Fn.

The client computer 1 displays the instrument address of each of the field instruments F1 to Fn, as shown on the management screen of FIG. 3, when the client computer 1 receives the instrument address of each of the field instruments F1 to Fn from the communication server 3. The operator S sees and confirms the management screen, and hence, can recognize which instrument address is used at that time. Accordingly, when, for example, another field instrument is newly added in the plant, the operator sets the instrument address of the added field instrument to an unused instrument address, in other words, an instrument address which is not displayed on the management screen (step S7).

On the other hand, when the client computer 1 receives the instrument address from the communication server 3, the client computer 1 transfers an instrument tag name and identification (ID) request, which requests the field instruments F1 to Fn corresponding to the received instrument address to provide an instrument tag name and an ID thereof, to the communication server 3 (step S8). That is, when the instrument address is input from the LAN communication portion 1c, the client computer 1 allows the LAN communication portion 1c to transfer the instrument tag name and ID request to the communication server 3. Then, when the communication server 3 receives the instrument tag name and ID request, the communication server 3 transfers the instrument tag name and ID request, which is similar to that transferred to the communication server 3, to the field instruments F1 to Fn corresponding to the instrument address designated by the instrument tag name and ID request (step S9).

As a result, the field instruments F1 to Fn corresponding to the designated instrument address transfer (provide) the instrument tag name and the instrument ID to the communication server 3 (step S10). The communication server 3 transfers (provides) the received instrument tag name and instrument ID to the client computer 1 (step S11). The client computer 1 provides the instrument tag name and the instrument ID to the operator S by displaying on the management screen (step S12). Furthermore, the client computer 1 allows the individual management tool to be in a state capable of starting up, and displays the state capable of starting up on the management screen, in addition to the display of the instrument tag name and the instrument ID on the management screen.

That is, when the instrument tag name and the instrument ID are received from the communication server 3, the LAN communication portion 1c of the client computer 1 outputs the received instrument tag name and instrument ID to the control and computing portion 1e. Then, the control and computing portion 1e outputs the instrument tag name and the instrument ID to the display portion 1b so as to display it on the display portion 1b. Together with this, the control and computing portion 1e identifies the individual management tool 1h corresponding to the instrument tag name and the instrument ID so as to display it on the display portion 1b.

The operator S can recognize the instrument tag name, the instrument ID, and the individual management tool 1h in the state capable of starting up with respect to the field instruments F1 to Fn of which the instrument address is displayed on the management screen. Thereby, the operator S starts up the individual management tool (application program for maintenance) 1h corresponding to the instrument tag name and the instrument ID (step S13). For example, when the instrument tag name is the flow meter, the operator S identifies and starts the application program, which is stored in the storage portion 1d in advance, as the individual management tool 1h for the flow meter, by operating the operation portion 1a.

Then, the operator S inputs a setting change request, which requests a change to the setting of each of the field instruments F1 to Fn, to the client computer 1 (step S14) by operating the operation portion 1a based on the man-to-machine interface provided by the individual management tool 1h. As a result, the client computer 1 transfers the input setting change request to the communication server 3 (step S15). That is, when the setting change request is input from the operation portion 1a, the control and computing portion 1e of the client computer 1 outputs the setting change request to the LAN communication portion 1c so as to transfer it to the communication server 3. The communication server 3 transfers the setting change request to each of the field instruments F1 to Fn (step S16). After that, each of the field instruments F1 to Fn changes and sets a measurement parameter in accordance with the setting change request (step S17).

The operator operates the individual management tool 1h by using the operation portion 1a, and hence, inputs a request for detailed instrument information except for the instrument tag name and the instrument ID (detail instrument information request) to the client computer 1 (step S18). The detailed instrument information includes, for example, a manufacture ID which a manufacturer individually provides to the field instruments F1 to Fn, a device type of the field instruments F1 to Fn, a device revision of the field instruments F1 to Fn, and the like.

When the detailed instrument information request is input from the operation portion 1a, the control and computing portion 1e of the client computer 1 outputs the input detailed instrument information request to the LAN communication portion 1c so as to transfer it to the communication server 3 (step S19). The communication server 3 transfers the detailed instrument information request to each of the field instruments F1 to Fn (step S20). Then, when each of the field instruments F1 to Fn receives the detailed instrument information request, each of the field instruments F1 to Fn transfers the detailed instrument information to the communication server 3 (step S21). The communication server 3 transfers (provides) the detailed instrument information to the client computer 1 (step S22). After that, the client computer 1 provides the detailed instrument information to the operator S by displaying on the management screen (S23). That is, when the detailed instrument information is input from the LAN communication portion 1c, the control and computing portion 1e of the client computer 1 outputs the detailed instrument information to the display portion 1b so as to display it on the management screen.

Then, the operator S inputs a setting change request, which reflects a consideration of the detailed instrument information acquired by a manner described above, to the client computer 1 (step S24). As a result, the client computer 1 transfers the setting change request to the communication server 3 (step S25). The communication server 3 transfers the setting change request to each of the field instruments F1 to Fn (step S26). After that, each of the field instruments F1 to Fn changes and sets the measurement parameter in accordance with the setting change request (step S27).

Although it is not shown in FIG. 2, when the client computer 1 acquires the instrument information from the communication server 3, the client computer 1 sequentially registers the acquired instrument information with the instrument information database 1g for every instrument address. That is, when the instrument information is input from the LAN communication portion 1c, the control and computing portion 1e of the client computer 1 outputs the input instrument information to the storage portion 1d so as to register it with the instrument information database 1g. The instrument information is registered with the instrument information database 1g as described above, and hence, the instrument information database 1g always stores the most up-to-date instrument information.

According to the present embodiment of the present invention, the client computer (field instrument management apparatus) 1 does not provide all of the instrument information of each of the field instruments F1 to Fn (instrument address, instrument tag name, instrument ID, and detailed instrument information) to the operator S after acquiring all of the information, however the client computer (field instrument management apparatus) 1 provides the instrument address, the instrument tag name, and the instrument ID to the operator S when the instrument address is acquired from the communication server 3, and when the instrument tag name and the instrument ID are acquired from the communication server 3. Therefore, the operator S can perform a management process, such as maintenance or the like, of the filed instruments F1 to Fn faster than the conventional case.

It is apparent that the present invention is not limited to the above embodiment, but may be modified and changed without departing from the scope and spirit of the invention.

In one example, although the client computer (field instrument management apparatus) 1 provides various instrument information to the operator S by displaying the management screen on the display portion 1b, the method, which provides the instrument information, is not limited to the management screen, in other words, a visual informing method. For example, the instrument information may be auditorialy informed by using a speaker, or may be informed both visually and auditorialy combined with each other.

In another example, although according to the above embodiment of the present invention, the field instrument management system includes the communication server 3, the field instrument management apparatus may be directly connected with the field bus without using the LAN cable 2 and the communication server 3. In this case, the field instrument management apparatus includes a field bus communication portion instead of the LAN communication portion.

According to the present invention, the field instrument management apparatus does not provide all of instrument information of the field instruments to the outside, but the field instrument management apparatus provides the instrument address, the instrument tag name, and the instrument ID when the instrument address is acquired, and when the instrument tag name and the instrument ID are acquired. Therefore, the operator (including the user) can perform management of the filed instruments faster than the conventional case.

Accordingly, while the preferred embodiment of the invention have been described and illustrated above, it should be understood that it is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

Alternately, although the invention has been described above in connection with preferred embodiment thereof, it will be appreciated by those skilled in the art in that the embodiment is provided solely for illustrating the invention, and should not be relied upon to construe the appended claims in a limiting sense.

What is claimed is:

1. A field instrument management apparatus for managing a field instrument by communicating therewith, comprising:
a management unit that transfers a first request, which requests to provide an instrument address, to said field instrument, and provides said instrument address to the outside at a first time at which said instrument address is acquired from said field instrument;
a management screen that displays the acquired instrument address so that a new instrument address of a newly added field instrument can be set to an unused instrument address;
a control and computing portion that outputs the acquired instrument address to the management screen so that the management screen can display the acquired instrument address;
an operation portion that receives an operation by an operator;
a LAN communication portion that communicates with a communication server in accordance with a communication standard of LAN, the LAN communication portion communicating with the field instrument via the communication server and a field bus that is standardized for communication in a plant;
a storage portion that stores an operating system (OS), a management program, an instrument information database, and an individual management tool, the management program managing the field instrument, the instrument information database containing attribute information that relates to the field instrument, the instrument information database being registered in the field instrument as instrument information, the instrument information database being assembled by acquiring the instrument information from the field instrument via a LAN cable, the communication server, and the field bus, the individual management tool specializing the field instrument and exclusively managing the field instrument.

2. The field instrument management apparatus as recited in claim 1, wherein
the control and computing portion controls the operation portion, the management screen, the LAN communication portion, and the storage portion, based on operation information, which is input from the operation portion, and received information, which is received by the LAN communication portion,
if the operation portion receives a instrument confirmation request related to the field instrument from the operator, then the operation portion outputs the instrument confirmation request to the control and computing portion, and the control and computing portion outputs the instrument address request to the LAN communication portion, and allows the LAN communication portion to transfer the instrument address request to the communication server, the instrument address request requesting the field instrument to provide the instrument address assigned individually to the field instrument, based on a specification of the field bus,
the LAN communication portion receives the instrument address of the field instrument via the communication server, and if the LAN communication portion receives the instrument address, then the control and computing portion outputs the instrument address to the management screen so that the management screen can display the instrument address, the communication server transfers an instrument address that is received only within a predetermined period from sending the instrument address request to the field instrument, and if the LAN communication portion receives the instrument address from the communication server, then the control and computing portion allows the LAN communication portion to transfer an instrument tag name and instrument ID request, which requests the field instrument corresponding to the received instrument address to provide an instrument tag name and an instrument ID thereof, to the communication server.

3. The field instrument management apparatus as recited in claim 1, wherein if the LAN communication portion receives the instrument tag name and the instrument ID via the communication server, then the LAN communication portion outputs the received instrument tag name and instrument ID to the control and computing portion, the control and computing portion outputs the instrument tag name and the instrument ID to the management screen so that the management screen can display the instrument tag name and the instrument ID, and the control and computing portion allows an individual management tool corresponding to the instrument tag name and the instrument ID to be in a state capable of starting up, and displays the state capable of starting up on the management screen, the operation portion receives a setting change request, which requests a change to a setting of the field instrument by the operator based on a man-to-machine interface provided by the individual management tool, if the operation portion receives the setting change request, then the control and computing portion outputs the setting change request to the LAN communication portion so as to transfer the setting change request to the communication server.

4. The field instrument management apparatus as recited in claim 3, wherein the operation portion receives a detail instrument information request requesting detailed instrument information except for the instrument tag name and the instrument ID by the operator based on the man-to-machine interface provided by the individual management tool, the detailed instrument information including a manufacture ID, which is individually provided to the field instrument, a device type of the field instrument, and a device revision of the field instrument, if the operation portion receives the detailed instrument information request, then the control and computing portion outputs the input detailed instrument information request to the LAN communication portion so as to transfer the input detailed instrument information request to the communication server 3, and if the LAN communication portion receives the detailed instrument information from the field instrument via the communication server, then the control and computing portion outputs the detailed instrument information to the management screen so that the management screen can display the detailed instrument information.

5. The field instrument management apparatus as recited in claim 1, wherein the operation portion receives a setting change request that reflects a consideration of the acquired detailed instrument information input by the operator, the LAN communication portion transfers the setting change request to the communication server, and if the instrument information is input from the LAN communication portion, then the control and computing portion outputs the input instrument information to the storage portion so as to register the input instrument information with instrument information database so that the instrument information database always stores the most up-to-date instrument information.

* * * * *